US012438988B2

(12) United States Patent
Verma

(10) Patent No.: US 12,438,988 B2
(45) Date of Patent: Oct. 7, 2025

(54) MANAGING MAC ADDRESS RANDOMIZATION TO PROVIDE INTEGRITY OF NETWORK POLICIES AND SERVICES ACROSS NETWORKS

(71) Applicant: Rakuten Mobile, Inc., Tokyo (JP)

(72) Inventor: Saurabh Verma, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/000,822

(22) PCT Filed: Sep. 29, 2022

(86) PCT No.: PCT/US2022/045144
§ 371 (c)(1),
(2) Date: Dec. 6, 2022

(87) PCT Pub. No.: WO2024/072388
PCT Pub. Date: Apr. 4, 2024

(65) Prior Publication Data
US 2024/0283869 A1    Aug. 22, 2024

(51) Int. Cl.
*H04M 15/00* (2006.01)
*H04L 61/50* (2022.01)
*H04L 101/622* (2022.01)
*H04W 84/12* (2009.01)

(52) U.S. Cl.
CPC ............ *H04M 15/66* (2013.01); *H04L 61/50* (2022.05); *H04L 2101/622* (2022.05); *H04W 84/12* (2013.01)

(58) Field of Classification Search
CPC .. H04M 15/66; H04L 61/50; H04L 2101/622; H04W 84/12
See application file for complete search history.

(56) References Cited

U.S. PATENT DOCUMENTS

| 2013/0346628 | A1  | 12/2013 | Canion et al. |
| 2015/0071271 | A1* | 3/2015  | Smedman ................. H04L 9/14 370/338 |
| 2017/0164378 | A1* | 6/2017  | Gunasekara ............ H04W 4/08 |
| 2017/0374034 | A1  | 12/2017 | Zuniga et al. |

\* cited by examiner

*Primary Examiner* — Duc C Ho
(74) *Attorney, Agent, or Firm* — HAUPTMAN HAM, LLP

(57) ABSTRACT

Media Access Control (MAC) address randomization is managed at the network level. An association request having a MAC address of a user equipment (UE) and a Globally Unique Wi-Fi Device Temporary Identifier (GUWDTI) parameter is received. A MAC policy to apply to the UE based the MAC address in the association request is determined based on the MAC address in the association request or based on the GUWDTI parameter that references the MAC policy in a MAC policy database. A Wi-Fi Device Temporary Identifier (WDTI) for identifying the UE in a current network realm is returned to the UE in an association response. The MAC policy database enables the integrity of network policies and services across networks to be maintained.

20 Claims, 14 Drawing Sheets

MANAGING MAC ADDRESS RANDOMIZATION TO PROVIDE INTEGRITY OF NETWORK POLICIES AND SERVICES ACROSS NETWORKS

RELATED APPLICATIONS

The present application is a National Phase of International Application No. PCT/US2022/045144, filed Sep. 29, 2022.

TECHNICAL FIELD

This description relates to a system for managing Media Access Control (MAC) address randomization at the network level to provide integrity of network policies and services across networks, and method of using the same.

BACKGROUND

In the wireless industry, a problem exists that is related to WLAN networks that provide the Wi-Fi connectivity to the end users. In earlier cases, devices provided the embedded Media Access Control (MAC) address of the device to connect the network and to identify the device. The MAC address was provided over an insecure channel to the network and the MAC address was able to be discovered by third parties using packet sniffers. Thus, others were able to obtain the MAC address and track the devices. Once the devices were able to be tracked, the location of the end user of the devices was able to be tracked also. Being able to track devices and the location of end users presents a privacy breach for the end user.

To address this problem, MAC address randomization from the device side was proposed to provide anonymity of the devices in the network to others trying to identify and track devices and end users. MAC address randomization involves randomizing the MAC address of the end devices to provide anonymity of the devices to the network. The MAC address changes periodically or based on a predetermined triggering event.

This become a paradoxical situation for the network service providers that provides services because the network service providers were in jeopardy of not being able to identify the device and provide the right network policies for the network services. For example, a network identifies a device with a previously unrecognized MAC address, due to MAC address randomization, as a new device that is trying to access the network. When a new device accesses the network for the first time, the network policies that are provided to the new device are setup. In response to the network identifying a device with a new MAC address as a new device, the device loses the service and has to login to the network again. Earlier strategies were suggested to address the anonymity of devices to network service providers. However, the earlier strategies for solving these problems were very specific to particular network service providers or network equipment providers.

SUMMARY

In at least embodiment, a method for managing Media Access Control (MAC) address randomization at the network level includes receiving an association request having a MAC address of a user equipment (UE) and a Globally Unique Wi-Fi Device Temporary Identifier (GUWDTI) parameter, determining a MAC policy to apply to the UE based on the MAC address in the association request, or based on the GUWDTI parameter that references the MAC policy in a MAC policy database, and returning, to the UE in an association response, a Wi-Fi Device Temporary Identifier (WDTI) for identifying the UE in a current network realm.

In at least one embodiment, a device for managing Media Access Control (MAC) address randomization at the network level, includes a memory storing computer-readable instructions, and a processor connected to the memory, wherein the processor is configured to execute the computer-readable instructions to receive an association request having a MAC address of a user equipment (UE) and a Globally Unique Wi-Fi Device Temporary Identifier (GUWDTI) parameter, determine a MAC policy to apply to the UE based on the MAC address in the association request, or based on the GUWDTI parameter that references the MAC policy in a MAC policy database, and return, to the UE in an association response, a Wi-Fi Device Temporary Identifier (WDTI) for identifying the UE in a current network realm.

In at least one embodiment, a non-transitory computer-readable media having computer-readable instructions stored thereon, which when executed by a processor causes the processor to perform operations including receiving an association request having a MAC address of a user equipment (UE) and a Globally Unique Wi-Fi Device Temporary Identifier (GUWDTI) parameter, determining a MAC policy to apply to the UE based on the MAC address in the association request, or based on the GUWDTI parameter that references the MAC policy in a MAC policy database, and returning, to the UE in an association response, a Wi-Fi Device Temporary Identifier (WDTI) for identifying the UE in a current network realm.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
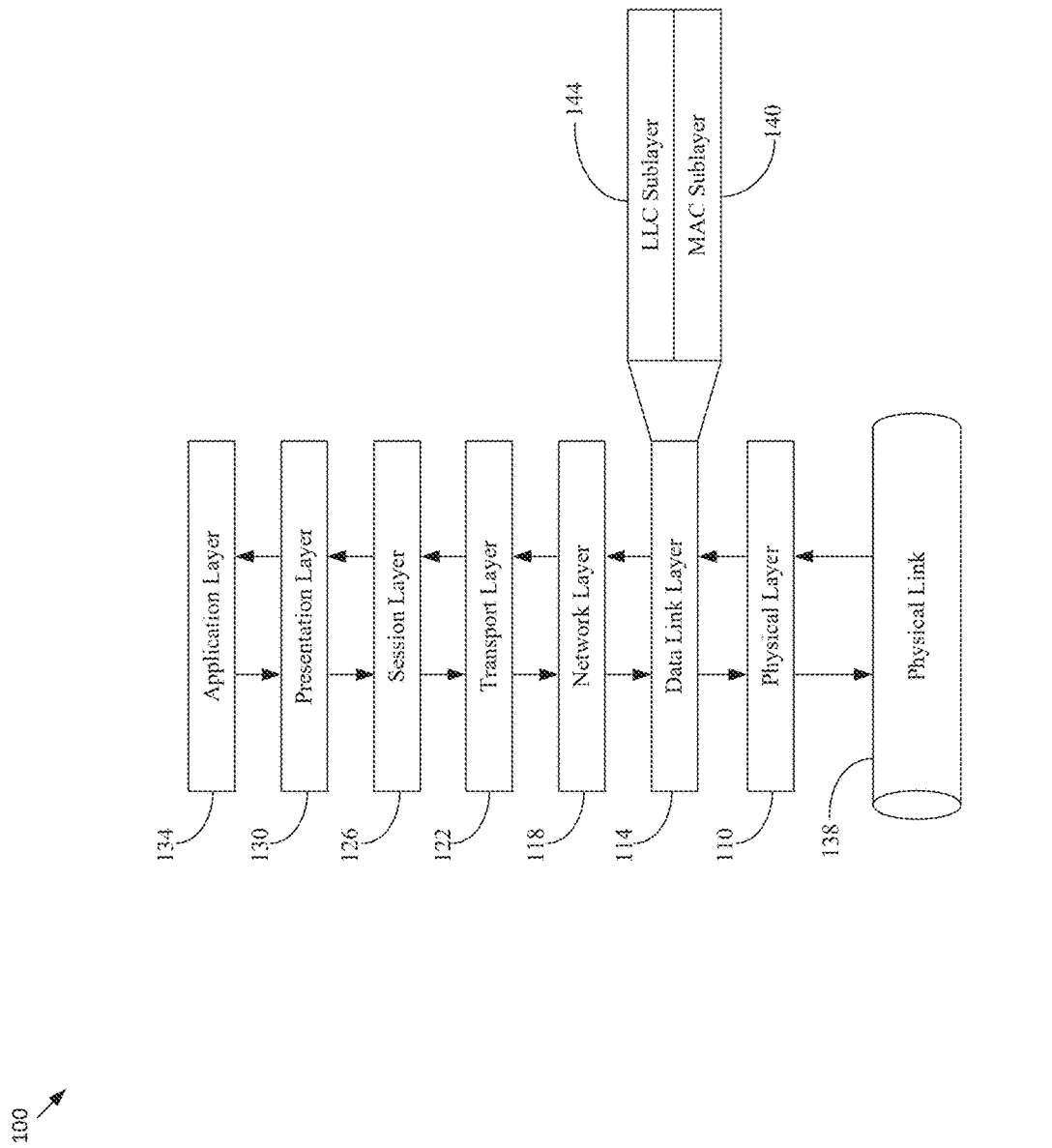
FIG. 1 illustrates the OSI (Open Systems Interconnection) model.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" generally indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and "at least one of A, B, or C" includes A, B, C, A and B, A and C, B and C, or A and B and C.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming data-stream or signaling-stream from UE.

In at least one embodiment, the problem associated with MAC address randomization is addressed from a global perspective using a method that does not care how the UE changes the MAC address. In at least one embodiment, the UE uniqueness is maintained, but MAC address randomization is managed at the network level in a way that service policies are able to be retained for the UE in response to changes to the MAC addresses of UE. So continuity of services are maintained and new policies are not created in response to the MAC address of UE changing, where a new MAC address is interpreted as a new UE accessing the network. When a new UE accesses the network for the first time, the network policies that are provided to the new UE are setup. In response to the network identifying UE with a new MAC address as a new UE, the UE loses the connection, or at least loses accesses to the service based previously provided policies, and the UE has to login to the network again. This becomes disruptive to the user.

At least one embodiment for managing MAC address randomization to provide integrity of network policies and services across networks, not only provider network but also across roaming with other networks. At least one embodiment provides complete integrity of device specific policy irrespective of MAC randomization, or otherwise causes minimal possible impact on network and device connectivity and services.

Embodiments described herein provide method that provides one or more advantages. For example, in response to a UE sending an Association Request, the MAC address is stored whether the received MAC address is an embedded MAC address or is a randomized MAC address. A MAC policy is able to be provided to the UE in response to the MAC address being an embedded MAC address or a randomized MAC address. A new MAC policy database is created that includes the address of the MAC policy as well as maintaining an entry for at least one randomized MAC address used by the UE to associate with the current realm using a particular Globally Unique Wireless Device Temporary Identifier (GUWDTI). The UE is able to change the MAC address again to a different randomized MAC address, but the system enables the UE to be identified using the GUWDTI. By using the GUWDTI, the integrity of appropriate MAC policies and services is maintained across networks even when the MAC address changes.

FIG. 1 illustrates the OSI (Open Systems Interconnection) model 100.

In FIG. 1, the OSI model 100 provides a conceptual framework that is used to describe the functions of a networking system. The OSI model characterizes computing functions into a universal set of rules in order to support interoperability between different products and software.

In FIG. 1, the OSI model 100 divides communications between a computing system using seven different abstraction layers: Physical Layer 110, Data Link Layer 114, Network Layer 118, Transport Layer 122, Session Layer 126, Presentation Layer 130, and Application Layer 134. The Physical Layer 110 receives and transmits packets via Physical Link 138. The OSI model 100 is used as a means to describe network architecture although the OSI model 100 does not map directly to specific systems.

At the Data Link Layer 114 (Layer 2), directly connected nodes are used to perform node-to-node data transfer where data is packaged into frames. The Data Link Layer 114 also corrects errors that may have occurred at the Physical Layer 110. The Data Link Layer 114 is represented by two sublayers. The first sublayer is the Media Access Control (MAC) sublayer 140, which provides flow control and multiplexing for device transmissions over a network. The second sublayer is the logical link control (LLC) sublayer 144, which provides flow and error control over the physical medium as well as identifies line protocols. In Layer 2 (Data Link Layer 114), multiple devices on the same Physical Link 138 are able to uniquely identify one another using MAC addresses.

Figure 2:
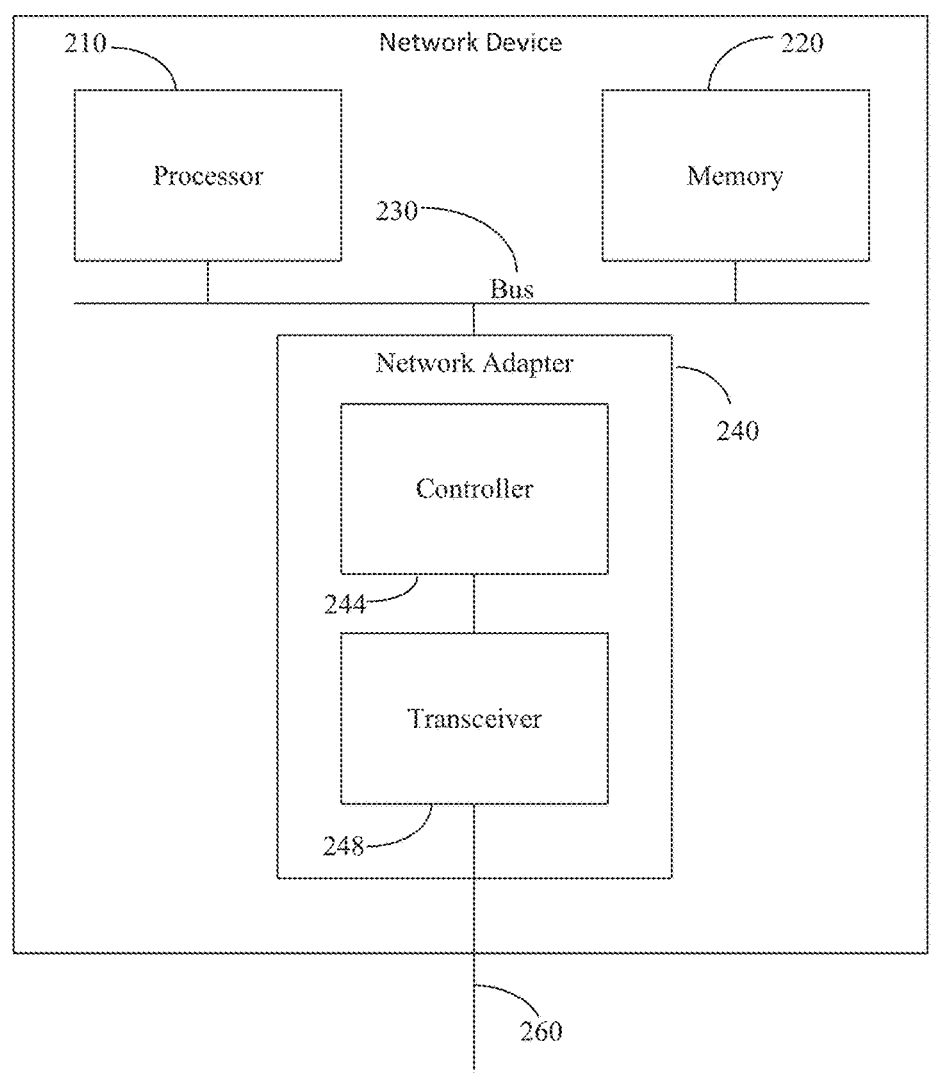
FIG. 2 illustrates a network device according to at least one embodiment.

FIG. 2 illustrates a network device 200 according to at least one embodiment.

In FIG. 2, the network device 200 includes processor 210, memory 220, bus 230, and Network Adapter 240. Network Adapter 240 includes controller 244, and Physical Transceiver 248. On the sending side, the controller 244 receives a datagram, the processor 210 encapsulates the datagram in a frame, and then the controller 244 provides the encapsulated dataframe to the transceiver 248 for transmission via the communication link 260. On the receiving side, the controller 244 receives the frame from the transceiver 248, and has the processor 210 extract the datagram. In response to the processor 210 detecting an error, the processor 210 sets the error-detection bits in the frame header.

Figure 3:
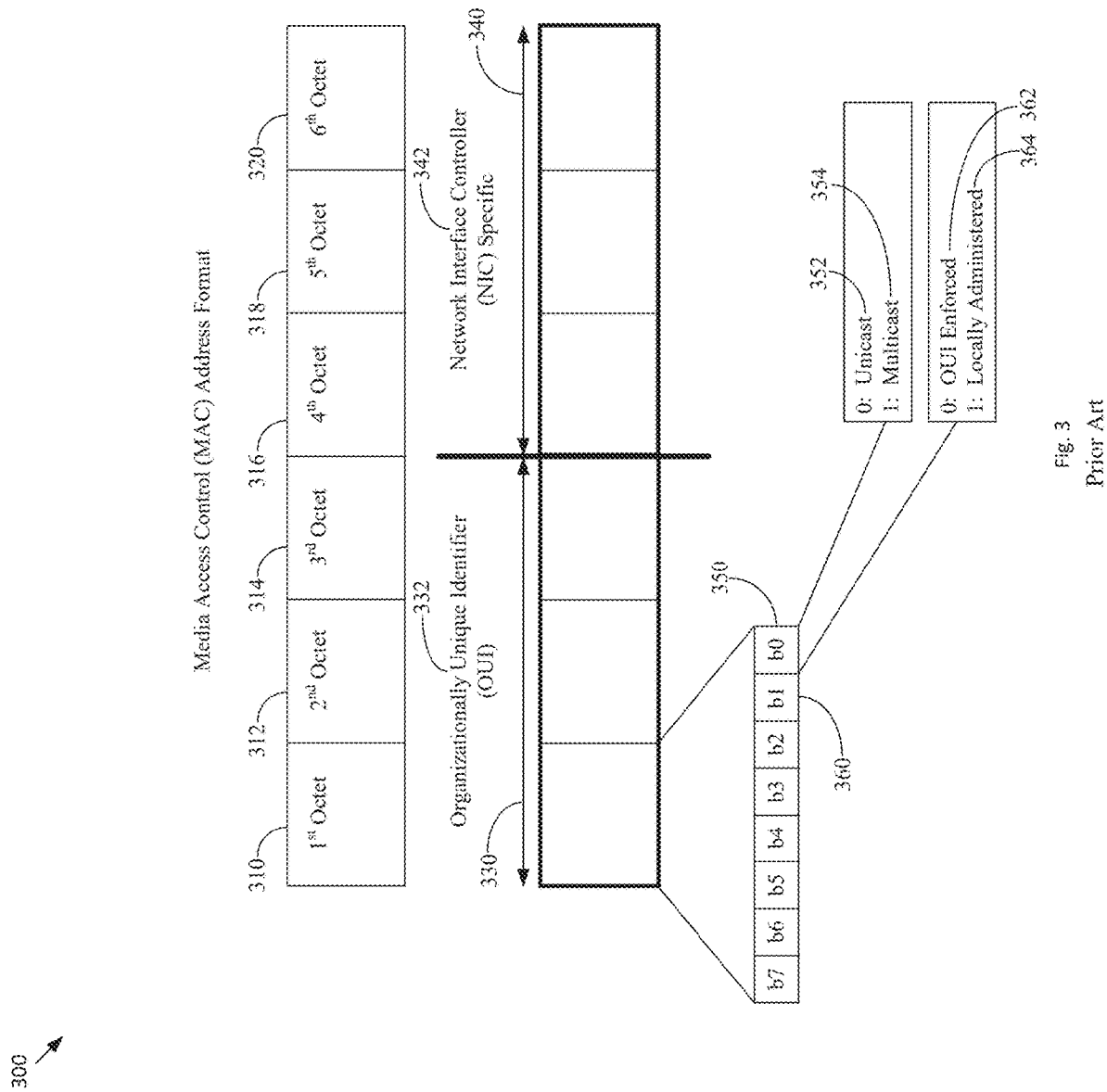
FIG. 3 illustrates the format of a MAC address.

FIG. 3 illustrates the format of a MAC address 300.

In FIG. 3, MAC address 300 uses a 64 bit format provided in 6 octets 310, 312, 314, 316, 318, 320 to uniquely identify a UE. The MAC address 300 is assigned by device manufacturers to a network interface controller (NIC) of a device for use as a network address in communications within a network segment, such as Ethernet, Wi-Fi, and Bluetooth. MAC address 300 is allotted and hardwired or hard-coded into a network interface controller (NIC) of a device. Thus, MAC addresses are often referred to as the burned-in address.

As describe with reference to FIG. 1, the MAC address 300 is provided to an AP from the L2 layer (Data Link Layer). The MAC address 300 is used by the L3 layer (Network Layer) to identify the UE sending frames or where information is to be sent for receipt by the UE. The 6 octets 310, 312, 314, 316, 318, 320 are divided into a first group of 3 octets 330 and a second group of 3 octets 340. As typically represented, the MAC address is often illustrated as 6 groups of 2 hexadecimal digits, separated by hyphens, colons, or without a separator, e.g., b4:a1:d1:04:79:01.

The first group of 3 octets 330 is the Organizationally Unique Identifier (OUI) 332 and identifies the manufacturer. IEEE Registration Authority Committee assigns these MAC prefixes to its registered vendors. The second group of 3 octets 340 is the NIC specific identifier 342 and is assigned by the manufacturer.

The first octet 310 provides information for identifying the type of MAC Address 300. In response to the Least Significant Bit (LSB) 350 being "0" 352, the frame is a unicast addressed frame that is only sent out to the interface leading to a specific, receiving NIC. In response to the Least Significant Bit (LSB) 350 being "1" 354, the frame is a multicast frame that is sent to a group of devices. The second most least significant bit 360 in the first octet 310 identifies a MAC address 300 is OUI enforced in response to being set to "0" 362, or is locally administered in response to being set to "1" 364.

MAC address 300 is also able to represent a randomized MAC address using the same format, but does not retain the actual physical address of the UE. The randomized MAC address is thus a virtual MAC address that rotates periodically or based on a certain event. The randomized MAC address is able to be obtained (e.g., sniffed) by another party, but the other party does not know whether the UE associated with the randomized MAC address is a new UE or a previously identified UE. However, this presents the same issue from the network point of view because services previously assigned to the UE may not be continued because the network is not able to determine which UE this is and what services have been previously assigned the to the UE.

Figure 4:
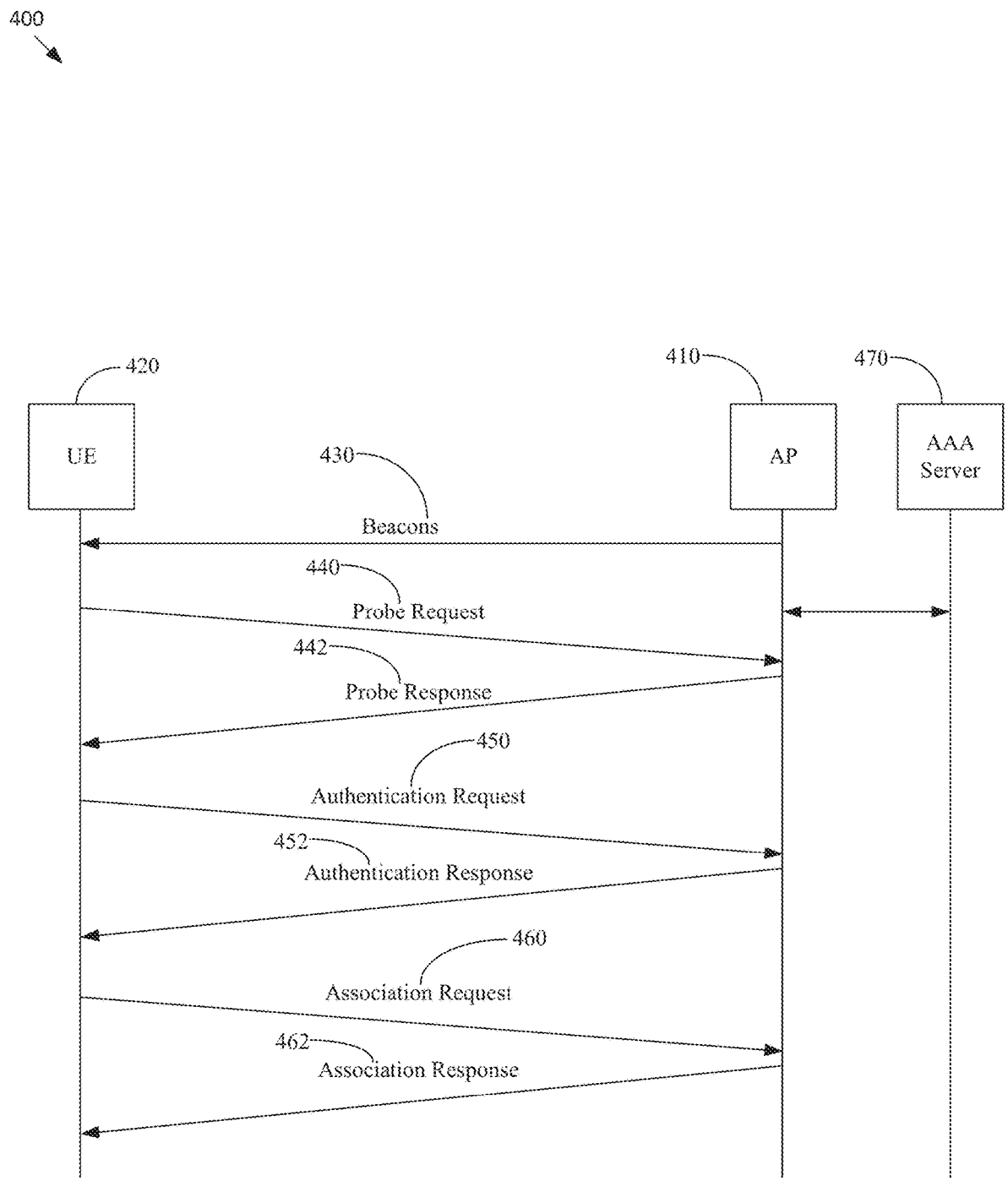
FIG. 4 illustrates a method for authentication and association using a MAC address of a client device according to at least one embodiment.

FIG. 4 illustrates a method 400 for authentication and association using a MAC address of a client device according to at least one embodiment.

In FIG. 4, to find Access Points (APs) 410 for association by the UE 420, UE 420 performs active or passive scanning. Passive scanning involves the UE 420 listening for Beacons 430 sent by APs 410 and building a list of wireless networks or APs 410. Beacon packets 430 from APs contain a Service Set Identifier (SSID), which is the wireless network name.

When UE 420 performs active scanning, the UE 410 sends Probe Requests 440 to an AP. The Probe Request 440 contains a unique identifier, i.e., the MAC address of the UE 420. The Probe Request 440 contains other information about the UE, such as supported data rates and 802.11 capabilities. AP 410 responds to Probe Requests 440 with Probe Response 442 that contains the SSID, a basic service set identifier (BSSID) that is the MAC address of the AP's radio for that service set, supported data rates, encryption types, and other wireless capabilities of the AP.

UE 420 establishes its identity with an AP 410 by sending an Authentication Request 450 that contains the hostname of UE 420 and the MAC address of UE 420. Upon receiving the MAC address of UE 420, the AP 410 searches its memory for a matching MAC address. An AP 410 may also be supported by an Authentication, Authorization and Accounting (AAA) server 470. AAA server 470 handles user requests for access to network resources and provides authentication, authorization, and accounting (AAA) services for the AP 410.

An Authentication Response 452 is received by the UE 420 from the AP 410 with a success or failure message. For example, a failure message is returned in response to MAC address of the UE 420 being explicitly excluded in a list maintained by the AP 410.

Once authentication is complete, UE 420 sends an Association Request 460 to associate (register) with the AP 410 to gain full access to the network associated with the AP 410. During association, the AP 410 records the identity and location for the UE 420 so that frames are properly delivered. AP 410 sends an Association Response 462 to indicate to the UE whether association was successful. Upon successful association of the UE 420 with the AP 410, AP 410 forwards frames to or from the UE 420.

One issue with MAC addresses is that when UE 420 is sending out Probe Requests 440, the MAC address of UE 420 is included in the Probe Request 440 and can be easily tracked. This feature has some benefits because some companies track UEs 420 of customers and users using the MAC address to provide customized user experiences on their wireless networks. But the ease of tracking MAC addresses also has raised privacy concerns for customers who do not want their movements and behaviors tracked.

Figure 5:
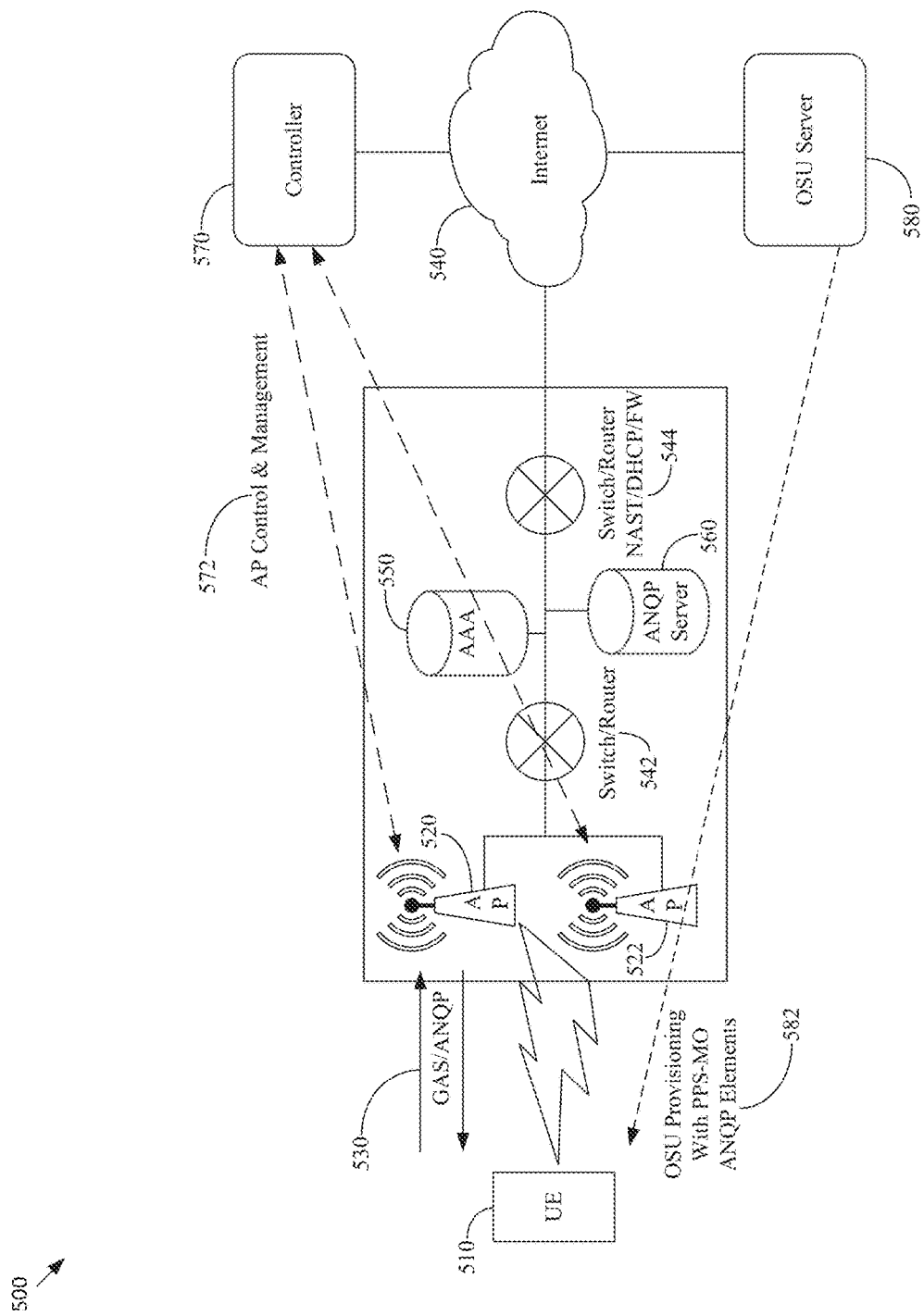
FIG. 5 illustrates a Wireless Local Area Network (WLAN) 500 using Generic Advertisement Service (GAS)/Access Network Query Protocol (ANQP) according to at least one embodiment.

FIG. 5 illustrates a Wireless Local Area Network (WLAN) 500 using Generic Advertisement Service (GAS)/Access Network Query Protocol (ANQP) according to at least one embodiment.

In FIG. 5, User Equipment (UE) 510 communicates with one or more APs 520, 522. The UE 510 communicates with APs 520, 522 using Generic Advertisement Service (GAS)/Access Network Query Protocol (ANQP) 530. GAS 530 that provides over-the-air higher-layer advertisements between APs 520, 522 or between a server in an external network and a UE 510. GAS is used prior to UE 510 being authenticated, or associated with APs 520, 522.

In at least one embodiment, the AP 520 is a Wi-Fi router that provides the Wi-Fi radio the UE 510 uses to connect to the network. For example, according to at least one embodiment, the APs 520, 522 are connected to the Internet 540 through a first Switch/Router 542 and a second Switch/Router 544. Further, in at least one embodiment, a Network Address Translation (NAT) server, a Dynamic Host Configuration Protocol (DHCP) server, and a Firewall (FW) server are provided by the second Switch/Router 544. A NAT server maps IP addresses by modifying network address information in the IP header of packets while they are in transit across a traffic routing device. A DHCP server provides TCP/IP configuration information, leases IP addresses and other information to devices. A FW server provides network security by filtering incoming and outgoing network traffic based on a set of defined rules.

APs 520, 522 is connected to network nodes, e.g., the Authorization Authentication and Accounting (AAA) server 550, the Access Network Query Protocol (ANQP) server 560, etc., and to the Internet 540. AAA server 550 handles user requests for access to network resources and provides AAA services. ANQP server 560 is configured with network information, including the realms in which APs 520, 522 provide network access. The ANQP server 560 configures a set of parameter that are provided to APs 520, 522 that the APs 520, 522 then send to the UE 510 to enable the UE 510 to discover the network. For example, ANQP server 560 provisions ANQP parameters, such as Network Realm Names, Public Land Mobile Networks (PLMN) identities, and Roaming Consortium Profiles.

Controller 570 acts as the management node for providing AP Control and Management 572 to APs 520, 522 and controls how UE 510 connect to the network. Online Sign-Up (OSU) Server 580 provides provisioning of policy parameters to UE 510 that is used to authenticate APs 520, 522 using Per Provider Subscription (PPS) Management Object (MO) and ANQP elements 582. The OSU server 580 is used to register UE 510 for service and to provision UE 510 with a credential to authenticate the network before the UE 510 joins the network. An OSU specific URL is provided to UE 510 through ANQP queries and access to the URL is provided by APs 520, 522 connected to OSU server 580. UE 510 connects to OSU server 580 for subscriptions and to get provisioned for provider specific parameters to validated APs 520, 522. Configuration and control of APs 520, 522 is provided by the Controller 570. Examples of policy parameters include expiration time, update interval, data usage limit etc. PPS-MO 582 from OSU Server 580 is used to establish credential information and to provide policy information to the UE 510. PPS-MO 582 allows network policies to be implemented by the APs 520, 522, such as whether an application has permission to access the network. Thus, the integrity of network policies and services across networks is maintained.

Figure 6:
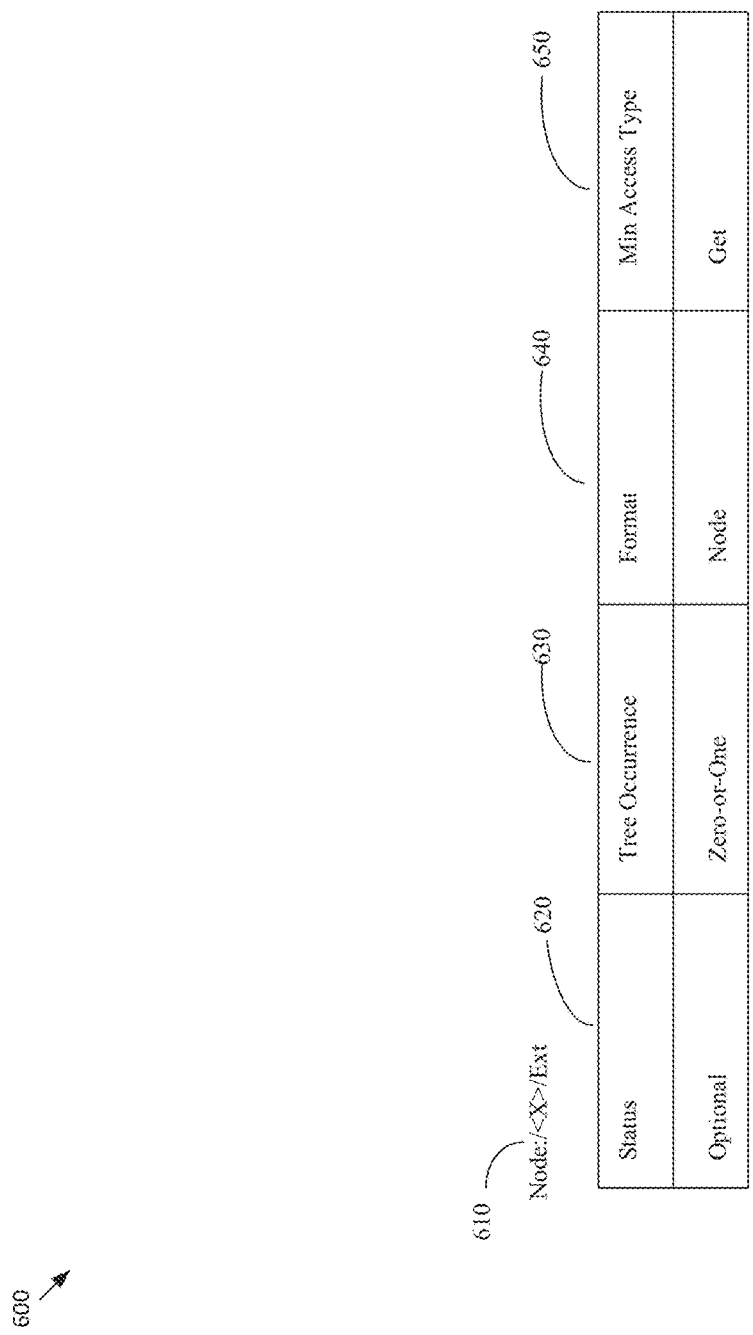
FIG. 6 illustrates an Open Mobile Alliance (OMA) Managed Object (MO) according to at least one embodiment.

FIG. 6 illustrates an Open Mobile Alliance (OMA) Managed Object (MO) 600 according to at least one embodiment.

OMA Mos 600 are used for management of UEs, such as mobile phones, PDAs, and tablet computers. Device management is intended to support configuration of UEs (including first time use), enabling and disabling features, allowing changes to settings and parameters of the device, loading new software and/or bug fixes on the UE, including applications and system software, and reporting errors from the UE, query about status of the UE, etc. A UE is able to implement all or a subset of these features. MO 600 is used to describe management information about an application or parameter of a UE. For example, MO parameters associated with Name include the Name leaf node 610 of the application, which is displayed in the UE. MO 600 provides Status (Option) 620, Tree Occurrence (Zeor-or-One) 630, Format (Node) 640, and Minimum Access Type (Get) 650.

Figure 7:
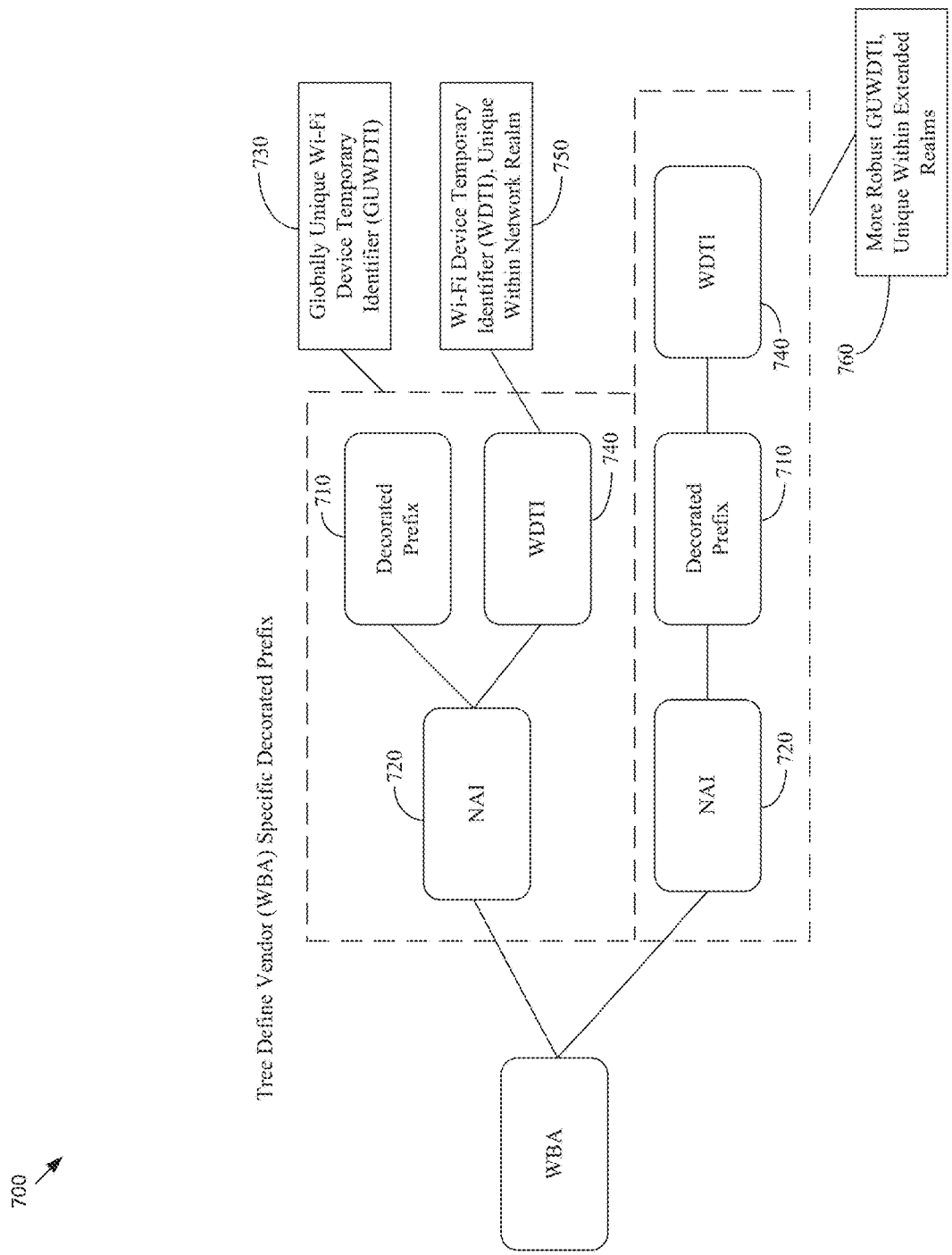
FIG. 7 illustrates identifier formats according to at least one embodiment.

FIG. 7 illustrates identifier formats 700 according to at least one embodiment.

In FIG. 7, the Decorated Prefix or Decorated Identity Prefix parameter 710, which was introduced by the Wireless Broadband Alliance (WBA), is combined with the NAI 720 to form a Globally Unique Wi-Fi Device Temporary Identifier (GUWDTI) 730. The Decorated Prefix 710 allows network operators to update the NAI 720 to perform explicit routing through multiple proxies inside of an AAA network. NAI 720 identifies users who request access to a network and provides a format for user identifiers submitted by a client during authentication to request access to a network. The syntax for NAI is "@abc.xyz". The NAI 720 is further used when roaming to identify the user, and to assist in the routing of the authentication request to the user's authentication server.

In at least one embodiment, the existing mechanisms or GAS and ANQP are used with additional enhancements to manage MAC address randomization at the network level. In at least one embodiment, a Wi-Fi Device Temporary Identifier (WDTI) parameter 740 is used in a similar manner to the Decorated Prefix 710, where the WDTI 740 is combined with the NAI 720 to form a Globally Unique WDTI (GUWDTI) 730. In at least one embodiment, the NAI 720, Decorated Prefix 710, and WDTI 740 are also able to be combined to provide a more robust GUWDTI 760.

Figure 8:
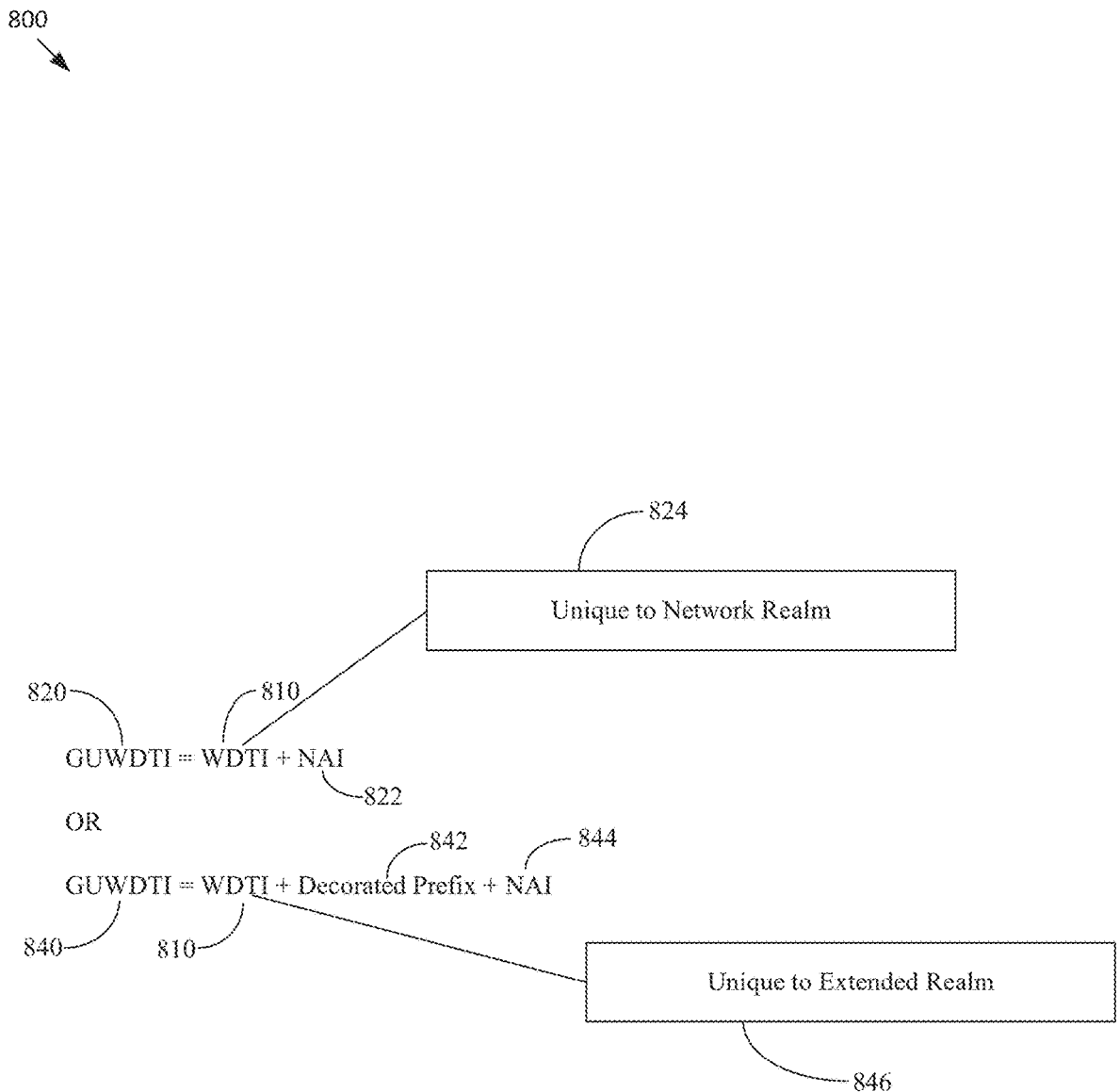
FIG. 8 illustrates formats for Globally Unique Wi-Fi Device Temporary Identifiers (GUWDTI) according to at least one embodiment.

FIG. 8 illustrates formats for Globally Unique Wi-Fi Device Temporary Identifiers (GUWDTI) 800 according to at least one embodiment.

In FIG. 8, a WDTI 810 is used to form GUWDTIs 820, 840. The WDTI 810 is a random number, which is a finite integer or a finite natural number. In FIG. 8, a first GUWDTI 820 is formed using the WDTI 810 (unique to Network Realm 824) and NAI 822. A second GUWDTI 840 is formed based on the WDTI 810 (unique to Extended Realm 846), a Decorated Prefix 842, and NAI 844.

The first and second GUWDTI 820, 840 are assigned through Per Provider Subscription Management Objects (PPS MO). The first and second GUWDTI 820, 840 act as a pointer to the list of currently assigned and previously assigned WDTI 810+NAI 822, or WDTI 810+Decorated Prefix 842+NAI 844.

The GUWDTI is stored in a UE. While the description of the GUWDTI seems to be a single value, the GUWDTI is also able to represent by a plurality of values, e.g., currently located GUWDTI, recent last GUWDTI, the back last GUWDTI. The GUWDTI is referenced as follows:

```
GUWDTI          {
                currently allocated;
                recent last;
                back last;
         } guwdti;
```

The manner that the WDTI 810 and NAI 822, and how the WDTI 810, Decorated Prefix 842, and NAI 844 are generated is open to different implementations or how these are combined.

GUWDTI uses a combination of WDTI and Network Realm Name to pull-push the device specific network policies within a network, or across the different realms of AAA servers. For example, in case of roaming between service providers or even with—in same service providers, but different network realm.

Figure 9:
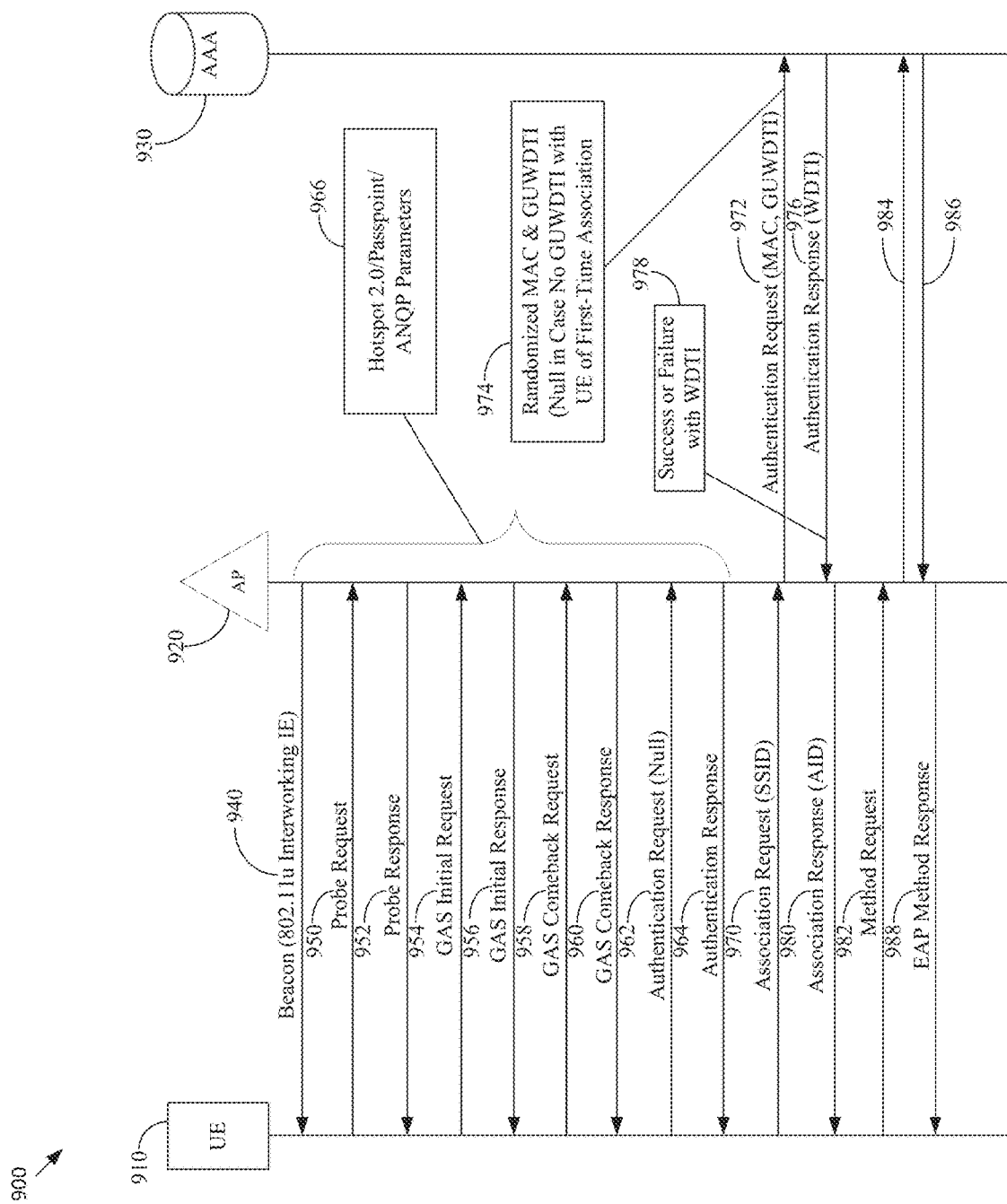
FIG. 9 illustrates the process flow for defining WDTI and GUWDTI according to at least one embodiment.

FIG. 9 illustrates the process flow 900 for defining WDTI and GUWDTI according to at least one embodiment.

In FIG. 9, a UE 910 is in communication with an AP 920. AP 920 is supported by AAA server 930. As described above, an AP 920 broadcasts Beacon frames 940 that identify the SSID of the AP 920. UE 910 sends a Probe Request 950 to AP 920 that includes the MAC address. The Probe Request 950 is sent over an insecure channel so another party is able to capture the MAC address. For a non-randomized MAC address, the other party is able to identify the UE 910 and the AP 920 that the UE 910 is connecting to and to track the location of the UE 910.

In response to the Probe Request 950, AP 920 sends the UE 910 a Probe Response 952. The Probe Request 950 is also able to provide additional information to an AP 920, such as rates supported by the UE 910, High Throughput (HT) capabilities, SSID list, vendor specific elements, etc. The messages in the initial sequence enable the UE 910 to also determine the different capabilities of the AP 920. For example, the AP 920 is able to respond to any requests made by the UE 910 in the Probe Request 950. The AP 920 is able to also provide to the UE 910 data rates supported by the AP 920, maximum/minimum transmit power, number of channels, Quality of Server (QoS) capabilities, etc.

After receiving the Probe Response 952 from the AP 920, the UE sends AP a GAS Initial Request 954. AP 920 sends UE 910 a GAS Initial Response 956. UE 910 sends AP 920 a GAS Comeback Request 958. AP 920 sends UE 910 a GAS Comeback Response 960. UE 910 sends AP 920 an Authentication Request 962. Here, the Authentication Request 962 is Null in response to no GUWDTI being provided by the UE 910 for the first-time the UE 910 is attempting association. The AP 920 sends the UE 910 an Authentication Response 964. These messages provide Hotspot 2.0/Passpoint/ANQP parameters 966 to the AP 920.

The UE 910 then attempts to associate with an AP 920 by sending an Association Request 970 with a particular Service Set Identifier (SSID), which is the name given to the network. The AP 920 sends an Association Request 972 to the AAA server 930 including the MAC address of the UE 910 and the GUWDTI 974. The AAA server 930 responds with an Authentication Response 976 with a result of success or failure with the WDTI 978 being provided by the AAA server 930 in response to success of the Association Request 972. Here, the WDTI is an existing WDTI or a new WDTI created by the AAA server 930. The AP 920 then sends the UE 910 an Association Response 980 that includes the Association Identifiers (AID).

The UE 910 sends the AP 920 an Extensible Authentication Protocol (EAP) Method Request 982 for negotiating the EAP method. The AP 920 sends the information 984 to the AAA server 930. The AAA server 930 sends a response 986 identifying the EAP method back to the AP 920. The AP 920 sends an EAP Method Response 988 to the UE 910.

Figure 10:
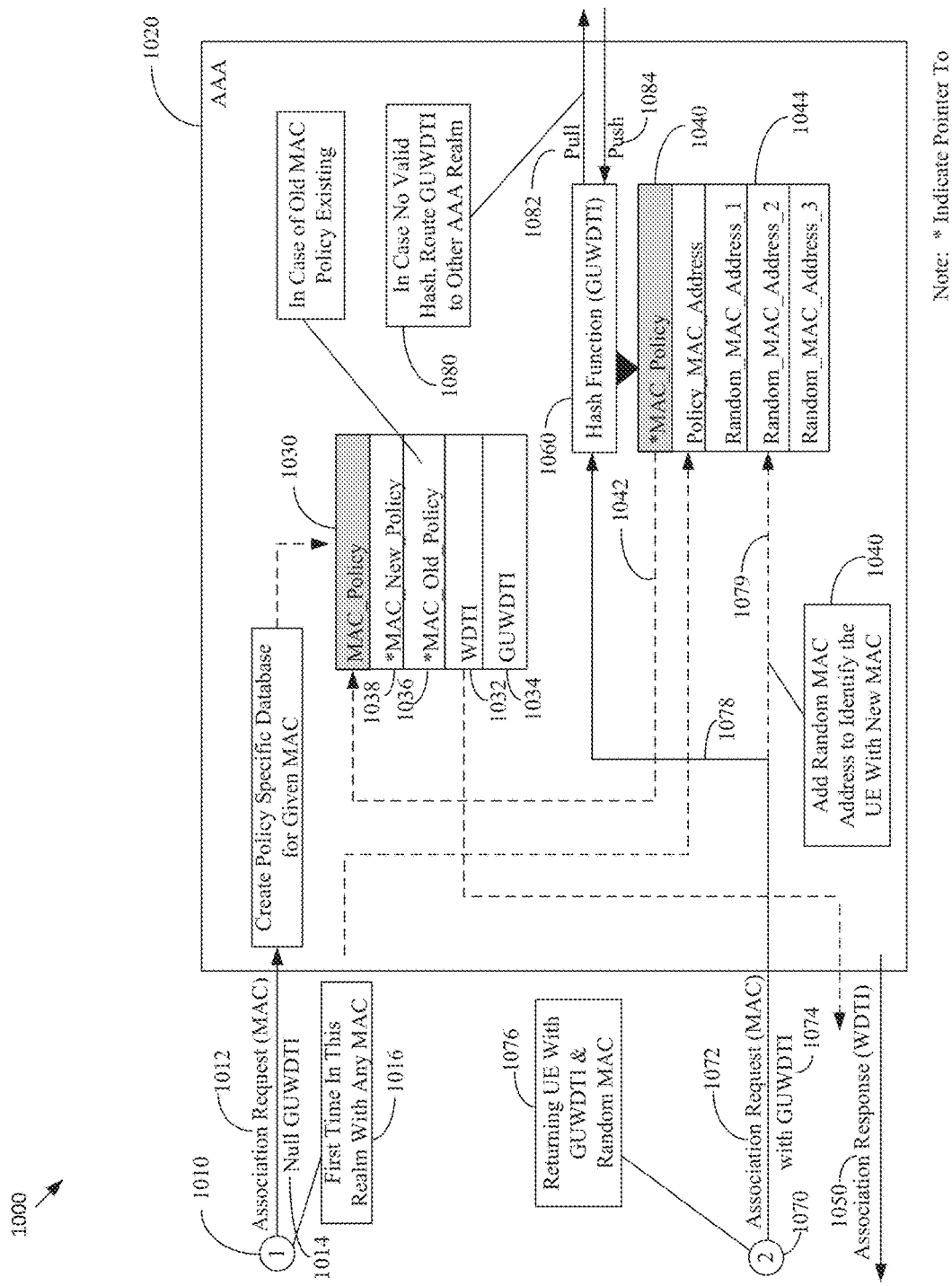
FIG. 10 illustrates a method for managing authentication requests from a UE that uses MAC address randomization according to at least one embodiment.

FIG. 10 illustrates a method 1000 for managing authentication requests from a UE that uses MAC address randomization according to at least one embodiment.

In a first case 1010 in FIG. 10, a UE has generated an Association Request 1012 that includes a MAC address. The MAC address is the embedded MAC address or is a randomized MAC address. The GUWDTI value in the Association Request is Null 1014 in response to no GUWDTI being provided by the UE or this is the first-time the UE is attempting association in this realm 1016. The AP routes the Association Request 1012 to the AAA server 1020.

The AAA server 1020 creates a MAC Policy specific database 1030 and generates a WDTI 1032 and GUWDTI 1034. In response the GUWDTI being a 'Null' value 1014, then the AAA server 1020 will create a MAC Policy specific database 1030, for the device policy. Also, in response to there being a specific MAC Old Policy 1036 with respect to this MAC address for policy control, the UE is determined to be an existing user of the network per the given MAC address, and that MAC Old Policy 1036 is indexed in new MAC Policy specific database 1030.

In response to there being an MAC Old Policy 1036 associated with the MAC address, the AAA server 1020 will provide the MAC Old Policy 1036 to new MAC Policy database 1040 (new Identity database). The AAA server 1020 is able to create a MAC New Policy 1038 and provide MAC New Policy 1038 to the MAC Policy specific database 1030. New MAC Policy database 1040 is indexed 1042 to MAC New Policy 1038. A reference to the old MAC Old Policy 1036 and to the MAC New Policy 1038 is maintained.

The AAA server 1020 then routes an Association Response 1050 with the WDTI 1032 to the UE. The AAA server 1020 will also create Hash Function 1060 with the GUWDTI 1034. The Hash Function 1060 is used to determine a MAC policy in Identity database 1040 with a reference to the MAC Old policy 1036 in the MAC New Policy 1038 based on the MAC Old Policy 1036 and the MAC address the UE provided in Association Request 1012.

A second case 1070 involves a second time that UE sends an Association Request 1072 to the network, wherein the Association Request 1072 includes the GUWDTI 1074. The Association Request 1072 for the returning UE includes the GUWDTI and a random MAC address 1076. In response to the Association Request 1072 having the GUWDTI 1074, the GUWDTI 1074 is sent 1078 directly to the Hash Function 1060 to identify an index to the MAC New Policy 1038. The AAA server 1020 is able to identify the appropriate MAC policy, either the old MAC policy or the new MAC policy.

The AAA server 1020 generates an Association Response 1050 with the WDTI 1032 to route to the UE or the AAA server 1020 generates a new WDTI 1032 that is routed to the UE in the Association Response 1050. By generating a new WDTI 1032, the AAA server 1020 is able to maintain anonymity of the UE even if another party is trying to listen in and obtain the WDTI 1032.

In response to the UE sending a randomized MAC and GUWDTI 1074 in an Association Request 1072 to the AAA sever 1020, and the hash of the GUWDTI is found invalid 1080, then the AAA server 1020 routes the request to Pull 1082 the right policy from other visited AAA. An AAA server 1020 in another realm recognizes the hash value based on the GUWDTI and routes a Push 1084 of the MAC policy associated with the GUWDTI to the AAA server in the current realm that sent the Pull 1082. The pull-push 1082/1084 process across AAA servers 1020 helps to retain the device specific policy across roaming networks and even within different realm of networks.

The MAC Old Policy 1036 is stored in the MAC New Policy 1038 and the random MAC address 1044 is stored 1079 in the new MAC Policy database 1040 to identify the UE using the new MAC address (i.e., the randomized MAC address 1044) so that the AAA server 1020 in the current realm will recognize this randomized MAC address 1044 the next time via the index generated by the Hash Function 1060. The AAA server 1020 in the current realm returns an Association Response 1050 with the policy parameters provided by the Push 1084.

An advantage is that in response to a UE sending an Association Request 1012, 1072, the MAC address is stored, wherein the received MAC address is an embedded MAC address or is a randomized MAC address. An appropriate MAC policy, e.g., MAC Old Policy 1036 or MAC New Policy 1038 is able to be provided to the UE in response to the MAC address being an embedded MAC address or a randomized MAC address. The MAC Policy database 1040 includes an index 1042 to a MAC policy in MAC New Policy 1038 as well as maintaining an entry for at least one randomized MAC address 1044 used by the UE to associate with the current realm using that particular GUWDTI 1074. The UE is able to change the MAC address again to a different randomized MAC address 1044, but the UE maintains the GUWDTI 1074. By using the GUWDTI 1074, the integrity of appropriate MAC policies and services is maintained across networks even when the MAC address changes.

Figure 11:
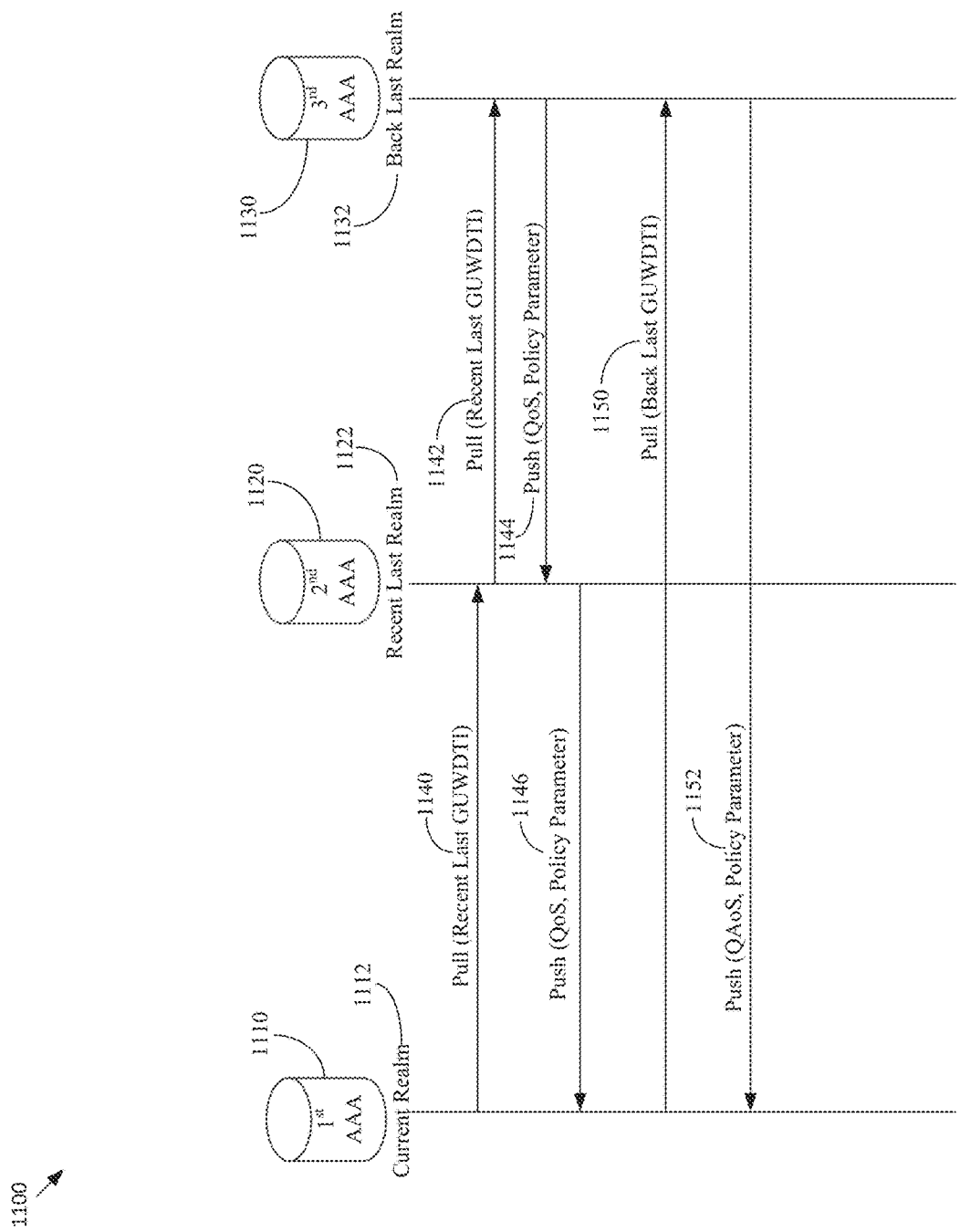
FIG. 11 illustrates a communication process between a plurality of realm according to at least one embodiment.

FIG. 11 illustrates a communication process 1100 between a plurality of realm according to at least one embodiment.

In FIG. 11, a first AAA server 1110 is in a current realm 1112. A second AAA server 1120 is in a recent last realm 1122, i.e., the most recent realm the UE has associated with. A third AAA server 1130 is in the back last realm 1132, the earlies realm that the UE has associated with.

A Pull 1140 with the recent last GUWDTI is issued by the first AAA server 1110 in the current realm 1112. In response, a Pull 1142 having the recent last GUWDTI is issued by the second AAA server 1120 in the recent last realm 1122 and routed to the third AAA server 1130 in the back last realm 1132. The third AAA server 1130 in the back last realm 1132 then routes a Push 1144 to the second AAA server 1120 in the recent last realm 1122. The Push 1144 from the third AAA server 1130 in the back last realm 1132 identifies the MAC policy associated with the recent last GUWDTI. The second AAA server 1120 in the recent last realm 1122 then routes a Push 1146 to the first AAA server 1110 in the current realm 1112. The Push 1146 from the second AAA server 1120 in the recent last realm 1122 includes the MAC policy associated with the recent last GUWDTI that was identified by the third AAA server 1130 in the back last realm 1132 (based on the GUWDTI).

The first AAA server 1110 in the current realm 1112 is also able to route a Pull 1150 with the back last GUWDTI to the third AAA server 1130 in the back last realm 1132. The third AAA server 1130 in the back last realm 1132 identifies the MAC policy associated with the back last GUWDTI and routes a Push 1152 with the MAC policy associated with the back last GUWDTI to the first AAA server 1110 in the current realm 1112. Accordingly, the integrity of the network policy and services across networks is maintained.

Figure 12:
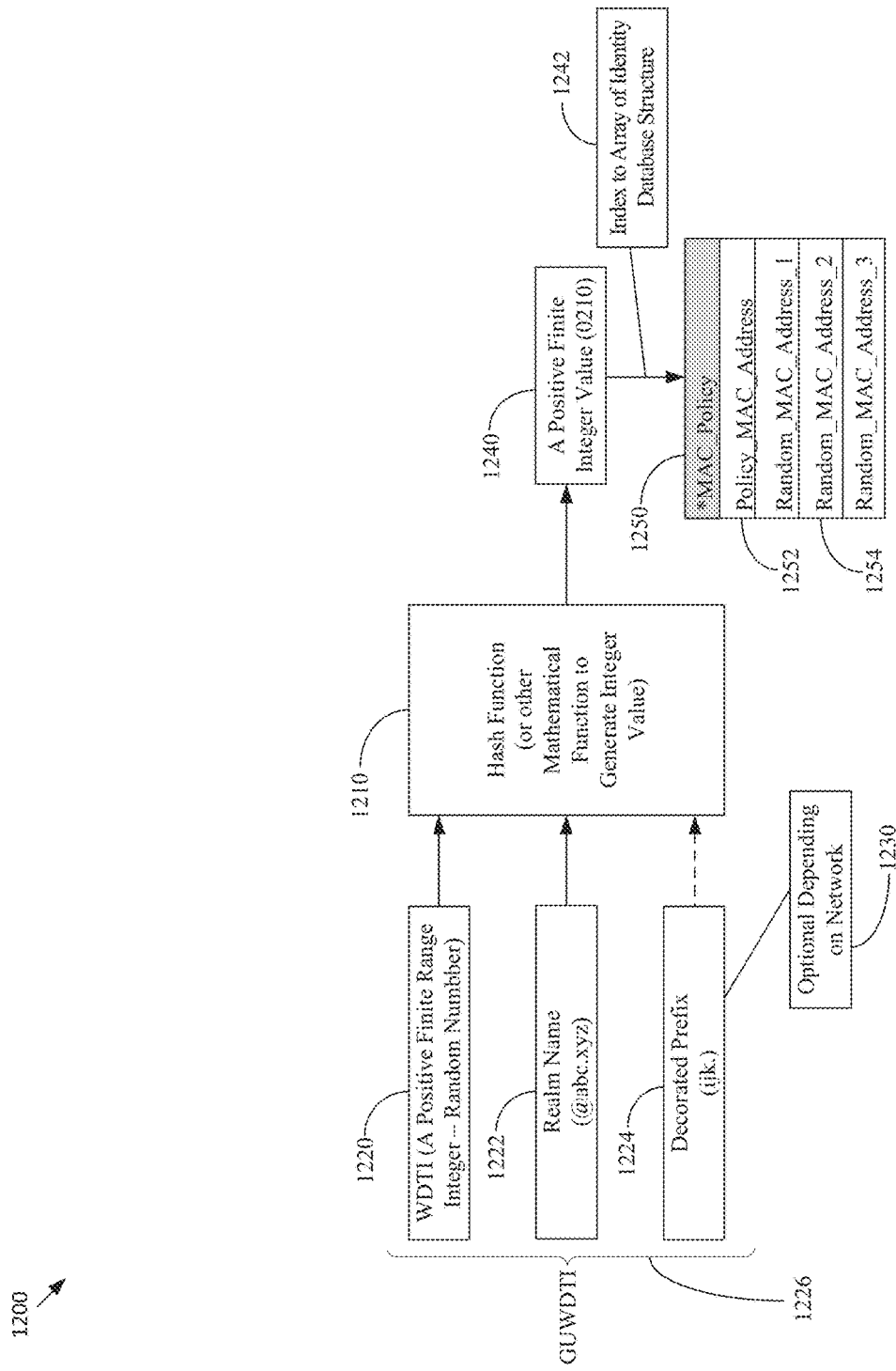
FIG. 12 illustrates hash value generation according to at least one embodiment.

FIG. 12 illustrates hash value generation 1200 according to at least one embodiment.

In FIG. 12, a Hash Function 1210 is shown receiving a WDTI 1220, Realm Name 1222, and Decorated Prefix 1224. The WDTI 1220 is formed from a set of identifiers and then processed by a Hash Function 1210, or other mathematical function that converts a numerical input value into another value. In at least one embodiment, Decorated Prefix 1224 is optional depending on the network 1230. The Realm Name 1222 is used for routing to the AAA server. AAA server creates MAC Policy database 1250, where Hash Function generates a Positive Finite Integer Value 1240 as an index to array of identity database structure 1242, e.g., MAC Policy database 1250, using GUWDTI 1226.

Index 1240 is based on hashing GUWDTI 1226, e.g., WDTI 1220, Realm Name 1222, and optionally Decorated Prefix 1224, to point to the MAC address and to specific policies (MAC_Policy) with respect to that MAC, in response to being selected as Policy_MAC_Address 1252. Randomized MAC addresses 1254 are also stored in MAC Policy database 1250. As explained earlier, the Decorated Prefix 1224 enables a GUWDTI 1226 to be formed that is unique to extended realms. In case of Null GUWDTI 1226, the MAC Policy database 1250 is created and a MAC address is stored to identify the UE.

The Hash Function 1210 generates the Positive Finite Integer Value 1240 as an index to array of identity database structure 1242, e.g., MAC Policy database 1250. The MAC Policy database 1250 is an "Identity" database as the database maintains the randomized MAC addresses 1254 as well as the MAC Policy address 1252. The Identity database 1250 maintains a pointer to MAC Policy data for MAC addresses of the UEs that come into network using randomization. The Identity database 1250 enables the integrity of network policies and services across networks to be maintained.

Figure 13:
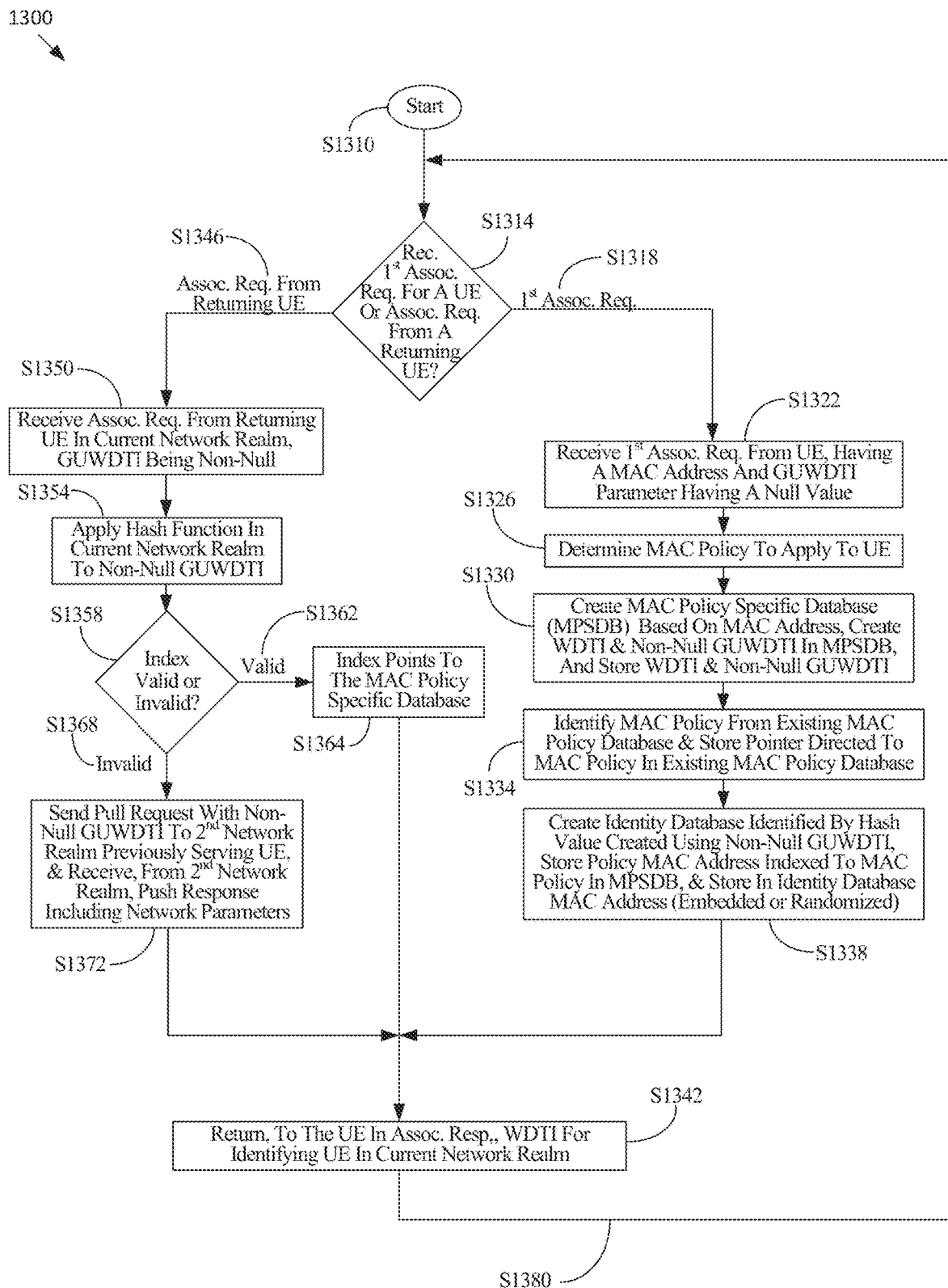
FIG. 13 is a flowchart of a method for managing Media Access Control (MAC) address randomization at the network level according to at least one embodiment.

FIG. 13 is a flowchart 1300 of a method for managing Media Access Control (MAC) address randomization at the network level according to at least one embodiment.

In FIG. 13, a processor for managing Media Access Control (MAC) address randomization at the network level starts S1310, and a determination is made whether a 1st association request for a UE is received or an association request from a returning UE is received in the current realm S1314.

In response to a first association request being received in the current network realm from the UE S1318, the first association request having a MAC address of a user equipment (UE) and a Globally Unique Wi-Fi Device Temporary Identifier (GUWDTI) parameter having a null value is received S1322. A Media Access Control (MAC) policy to apply to the UE based the MAC address in the association request is determined S1326. A MAC policy specific database associated with the UE is created based on the MAC address, a Wi-Fi Device Temporary Identifier (WDTI) and a non-null GUWDTI parameter are created, and the WDTI and the non-null GUWDTI parameter are stored in the MAC policy specific database associated with the UE S1330. The MAC policy from an existing MAC Policy database is then identified and a pointer is stored in the MAC Policy specific database that is directed to the MAC policy in the existing MAC Policy database S1334.

An Identity database identified by a hash value created by a hash function applied to the non-null GUWDTI is created, a Policy MAC address indexed to the MAC Policy in the MAC Policy specific database is stored in the Identity database and the MAC address is stored in the Identity database, wherein the MAC address is an embedded MAC address or the MAC address is a randomized MAC address S1338. The WDTI for identifying the UE in the current network realm is then returned to the UE in an association response S1342.

In response to receiving association request from a returning UE S1346, the association request includes a GUWDTI parameter that is a non-null GUWDTI parameter S1350. A determination is made whether an index created by hash function in the current network realm using the non-null GUWDTI parameter is valid or invalid S1358.

In response to the index being valid S1362, the index points to the MAC policy specific database S1364. The WDTI for identifying the UE in the current network realm is returned to the UE in an association response S1342.

In response to the index being invalid S1368, a Push response including network parameters associated with the UE identified based on a valid index generated using the non-null GUWDTI in the second network realm is received in the current network realm from the second network realm S1372. The WDTI for identifying the UE in the current network realm is then returned to the UE in an association response S1342. Accordingly, the integrity of network policies and services is maintained across networks.

The process then returns to process any other association requests that are received S1380.

At least one embodiment of the method receives an association request having a MAC address of a user equipment (UE) and a Globally Unique Wi-Fi Device Temporary Identifier (GUWDTI) parameter, determines a MAC policy to apply to the UE based the MAC address in the association request, and a Wi-Fi Device Temporary Identifier (WDTI) for identifying the UE in a current network realm is returned to the UE in an association response.

Figure 14:
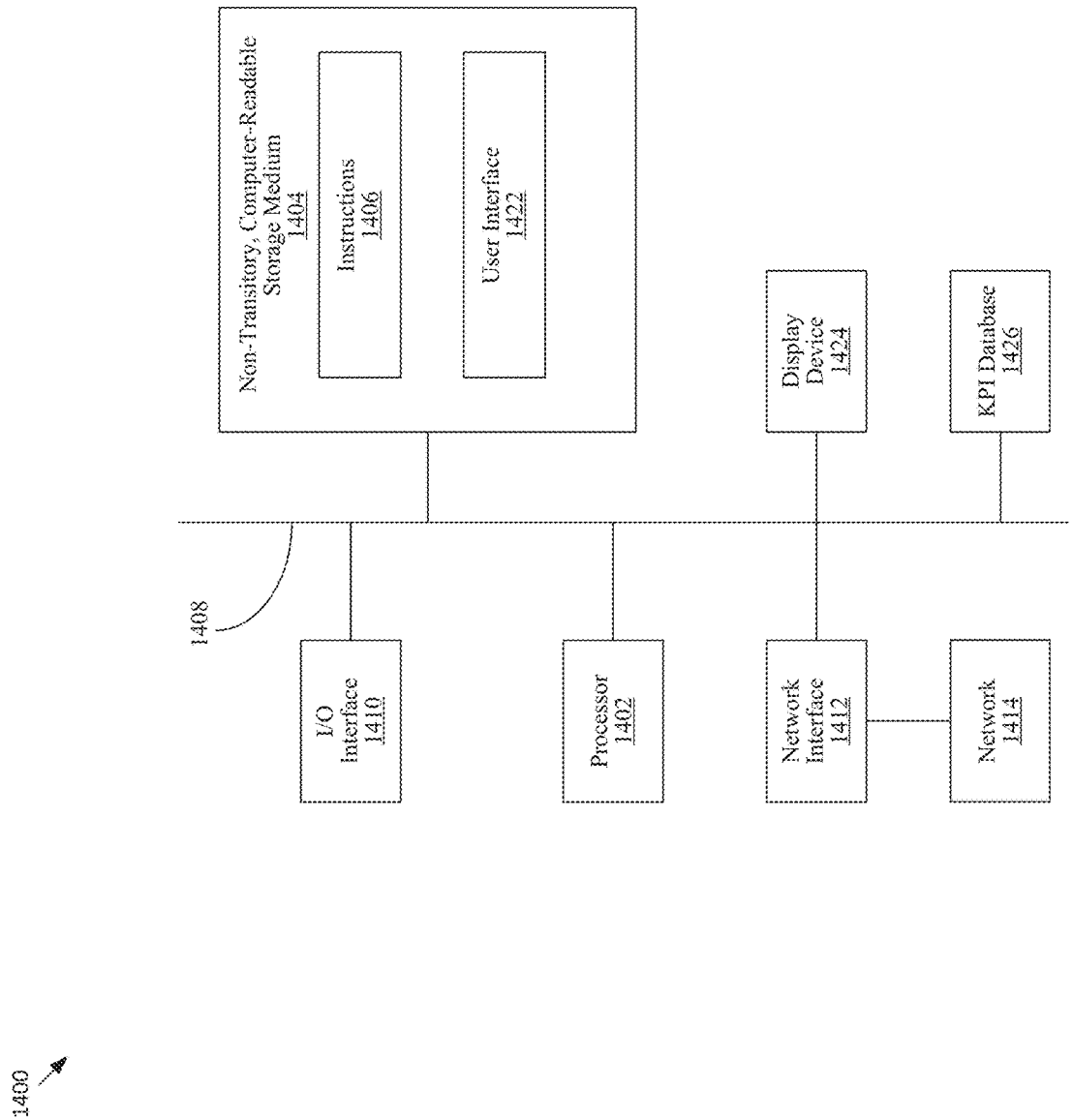
FIG. 14 is a high-level functional block diagram of a processor-based system according to at least one embodiment.

FIG. 14 is a high-level functional block diagram of a processor-based system 1400 according to at least one embodiment.

In at least one embodiment, processing circuitry 1400 manages Media Access Control (MAC) address randomization at the network level. Processing circuitry 1400 implements the method for managing Media Access Control (MAC) address randomization at the network level using processor 1402. Processing circuitry 1400 also includes a non-transitory, computer-readable storage medium 1404 that is used to manage Media Access Control (MAC) address randomization at the network level. Storage medium 1404, amongst other things, is encoded with, i.e., stores, instructions 1406, i.e., computer program code that are executed by processor 1402 causes processor 1402 to perform operations for managing Media Access Control (MAC) address randomization at the network level. Execution of instructions 1406 by processor 1402 represents (at least in part) a network visualization application which implements at least a portion of the methods described herein in accordance with one or more embodiments (hereinafter, the noted processes and/or methods).

Processor 1402 is electrically coupled to computer-readable storage medium 1404 via a bus 1408. Processor 1402 is electrically coupled to an Input/output (I/O) interface 1410 by bus 1408. A network interface 1412 is also electrically connected to processor 1402 via bus 1408. Network interface 1412 is connected to a network 1414, so that processor 1402 and computer-readable storage medium 1404 connect to external elements via network 1414. Processor 1402 is configured to execute instructions 1406 encoded in computer-readable storage medium 1404 to cause processing circuitry 1400 to be usable for performing at least a portion of the processes and/or methods. In one or more embodiments, processor 1402 is a Central Processing Unit (CPU), a multi-processor, a distributed processing system, an Application Specific Integrated Circuit (ASIC), and/or a suitable processing unit.

Processing circuitry 1400 includes I/O interface 1410. I/O interface 1410 is coupled to external circuitry. In one or more embodiments, I/O interface 1410 includes a keyboard, keypad, mouse, trackball, trackpad, touchscreen, and/or cursor direction keys for communicating information and commands to processor 1402.

Processing circuitry 1400 also includes network interface 1412 coupled to processor 1402. Network interface 1412 allows processing circuitry 1400 to communicate with network 1414, to which one or more other computer systems are connected. Network interface 1412 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 1400 is configured to receive information through I/O interface 1410. The information received through I/O interface 1410 includes one or more of instructions, data, design rules, libraries of cells, and/or other parameters for processing by processor 1402. The information is transferred to processor 1402 via bus 1408. Processing circuitry 1400 is configured to receive information related to a User Interface (UI) through I/O interface 1410. The information is stored in computer-readable medium 1404 as UI 1422.

In one or more embodiments, one or more non-transitory computer-readable storage media 1404 having stored thereon instructions (in compressed or uncompressed form) that may be used to program a computer, processor, or other electronic device) to perform processes or methods described herein. The one or more non-transitory computer-readable storage media 1404 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 1404 includes a Compact Disk-Read Only Memory (CD-ROM), a Compact Disk-Read/Write (CD-R/W), and/or a Digital Video Disc (DVD).

In one or more embodiments, storage medium 1404 stores computer program code 1406 configured to cause processing circuitry 1400 to perform at least a portion of the processes and/or methods for managing Media Access Control (MAC) address randomization at the network level. In one or more embodiments, storage medium 1404 also stores information, such as algorithm which facilitates performing at least a portion of the processes and/or methods for managing Media Access Control (MAC) address randomization at the network level. Accordingly, in at least one embodiment, the processor circuitry 1400 performs a method for managing Media Access Control (MAC) address randomization at the network level. The process includes receiving an association request having a MAC address of a user equipment (UE) and a Globally Unique Wi-Fi Device Temporary Identifier (GUWDTI) parameter, determining a MAC policy to apply to the UE based on the MAC address in the association request or based on the GUWDTI parameter that references the MAC policy in a MAC policy database, and returning, to the UE in an association response, a Wi-Fi Device Temporary Identifier (WDTI) for identifying the UE in a current network realm.

At least one embodiment provides at least the advantages of storing, in response to a UE sending an Association Request, the MAC address regardless of whether the received MAC address is an embedded MAC address or is a randomized MAC address. A MAC policy is able to be provided to the UE, wherein whether the MAC address is an embedded MAC address or a randomized MAC address. A new MAC policy database is created that includes the address of the MAC policy as well as maintaining an entry for at least one randomized MAC address used by the UE to associate with the current realm using a particular Globally Unique Wireless Device Temporary Identifier (GUWDTI). The UE is able to change the MAC address again to a different randomized MAC address, but the system enables the UE to be identified using the GUWDTI. By using the GUWDTI, the integrity of appropriate MAC policies and services is maintained across networks even when the MAC address changes. Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for managing Media Access Control (MAC) address randomization at a network level, comprising:
   receiving an association request having a MAC address of a user equipment (UE) and a Globally Unique Wi-Fi Device Temporary Identifier (GUWDTI) parameter;
   determining a MAC policy to apply to the UE based on the MAC address in the association request; and
   returning, to the UE in an association response, a Wi-Fi Device Temporary Identifier (WDTI) for identifying the UE in a current network realm.

2. The method of claim 1, wherein the receiving the association request having the GUWDTI parameter further comprises receiving the association request having the GUWDTI parameter formed from the WDTI and a realm address, or the WDTI, the realm address, and a Decorated Prefix.

3. The method of claim 1, wherein the receiving the association request having the GUWDTI parameter further comprises receiving a first association request received in the current network realm from the UE, the GUWDTI parameter having a null value.

4. The method of claim 3 further comprising:
   creating a MAC policy specific database associated with the UE based on the MAC address;
   creating the WDTI and a non-null GUWDTI parameter;
   storing the WDTI and the non-null GUWDTI parameter in the MAC policy specific database associated with the UE;
   identifying the MAC policy from an existing MAC Policy database and storing a pointer in the MAC Policy specific database directed to the MAC policy in the existing MAC Policy database;
   creating an Identity database identified by a hash value created by a hash function applied to the non-null GUWDTI;
   storing, in the Identity database, a Policy MAC address indexed to the MAC Policy in the MAC Policy specific database; and
   storing in the Identity database the MAC address, wherein the MAC address is an embedded MAC address or the MAC address is a randomized MAC address.

5. The method of claim 1, wherein the receiving the association request having the MAC address of the UE and the GUWDTI parameter further comprises receiving the association request from a returning UE in the current network realm, the GUWDTI parameter being a non-null GUWDTI parameter.

6. The method of claim 5 further comprising applying a hash function in the current network realm to the non-null GUWDTI parameter to generate an index, wherein the index points to a MAC policy specific database associated with the returning UE based on the MAC address.

7. The method of claim 5 further comprising:
   applying a hash function of the current network realm to the non-null GUWDTI parameter to generate a first index, wherein the first index is invalid in the current network realm;
   sending a Pull request with the non-null GUWDTI to a second network realm, the second network realm previously serving the UE; and
   receiving, from the second network realm, a Push response including network parameters associated with the UE identified based on a valid index generated using the non-null GUWDTI in the second network realm.

8. A device for managing Media Access Control (MAC) address randomization at a network level, comprising:
   a memory storing computer-readable instructions; and
   a processor configured to execute the computer-readable instructions to:
   receive an association request having a MAC address of a user equipment (UE) and a Globally Unique Wi-Fi Device Temporary Identifier (GUWDTI) parameter;
   determine a MAC policy to apply to the UE based on the MAC address in the association request; and
   return, to the UE in an association response, a Wi-Fi Device Temporary Identifier (WDTI) for identifying the UE in a current network realm.

9. The device of claim 8, wherein the GUWDTI parameter is formed from the WDTI and a realm address, or the WDTI, the realm address, and a Decorated Prefix.

10. The device of claim 8, wherein the association request is a first association request received in the current network realm from the UE and wherein the GUWDTI parameter has a null value.

11. The device of claim 10, wherein the processor is further configured to:
   create a MAC policy specific database associated with the UE based on the MAC address;
   create the WDTI and a non-null GUWDTI parameter;
   store the WDTI and the non-null GUWDTI parameter in the MAC policy specific database associated with the UE;

identify the MAC policy from an existing MAC Policy database and storing a pointer in the MAC Policy specific database directed to the MAC policy in the existing MAC Policy database;

create an Identity database identified by a hash value created by a hash function applied to the non-null GUWDTI;

store, in the Identity database, a Policy MAC address indexed to the MAC Policy in the MAC Policy specific database; and store in the Identity database the MAC address, wherein the MAC address is an embedded MAC address or the MAC address is a randomized MAC address.

12. The device of claim 8, wherein the association request is associated with a returning UE in the current network realm from the UE, and wherein the GUWDTI parameter is a non-null GUWDTI parameter.

13. The device of claim 12, wherein the processor is further configured to apply a hash function in the current network realm to the non-null GUWDTI parameter to generate an index, wherein the index points to a MAC policy specific database associated with the returning UE based on the MAC address.

14. The device of claim 12, wherein the processor is further configured to:

apply a hash function of the current network realm to the non-null GUWDTI parameter to generate a first index, wherein the first index is invalid in the current network realm;

send a Pull request with the non-null GUWDTI to a second network realm, the second network realm previously serving the UE; and receive, from the second network realm, a Push response including network parameters associated with the UE identified based on a valid index generated using the non-null GUWDTI in the second network realm.

15. A non-transitory computer-readable media having computer-readable instructions stored thereon, which when executed by a processor causes the processor to perform operations comprising:

receiving an association request having a MAC address of a user equipment (UE) and a Globally Unique Wi-Fi Device Temporary Identifier (GUWDTI) parameter;

determining a MAC policy to apply to the UE based on the MAC address in the association request; and returning, to the UE in an association response, a Wi-Fi Device Temporary Identifier (WDTI) for identifying the UE in a current network realm.

16. The non-transitory computer-readable media of claim 15, wherein the receiving the association request having the GUWDTI parameter further comprises receiving the association request having the GUWDTI parameter formed from the WDTI and a realm address, or the WDTI, the realm address, and a Decorated Prefix, and wherein the receiving the association request having the GUWDTI parameter further comprises receiving a first association request received in the current network realm from the UE, the GUWDTI parameter having a null value.

17. The non-transitory computer-readable media of claim 16 further comprising:

creating a MAC policy specific database associated with the UE based on the MAC address;

creating the WDTI and a non-null GUWDTI parameter;

storing the WDTI and the non-null GUWDTI parameter in the MAC policy specific database associated with the UE;

identifying the MAC policy from an existing MAC Policy database and storing a pointer in the MAC Policy specific database directed to the MAC policy in the existing MAC Policy database;

creating an Identity database identified by a hash value created by a hash function applied to the non-null GUWDTI;

storing, in the Identity database, a Policy MAC address indexed to the MAC Policy in the MAC Policy specific database; and storing in the Identity database the MAC address, wherein the MAC address is an embedded MAC address or the MAC address is a randomized MAC address.

18. The non-transitory computer-readable media of claim 15, wherein the receiving the association request having the MAC address of the UE and the GUWDTI parameter further comprises receiving the association request from a returning UE in the current network realm, the GUWDTI parameter being a non-null GUWDTI parameter.

19. The non-transitory computer-readable media of claim 18 further comprising applying a hash function in the current network realm to the non-null GUWDTI parameter to generate an index, wherein the index points to a MAC policy specific database associated with the returning UE based on the MAC address.

20. The non-transitory computer-readable media of claim 18 further comprising:

applying a hash function of the current network realm to the non-null GUWDTI parameter to generate a first index, wherein the first index is invalid in the current network realm;

sending a Pull request with the non-null GUWDTI to a second network realm, the second network realm previously serving the UE; and receiving, from the second network realm, a Push response including network parameters associated with the UE identified based on a valid index generated using the non-null GUWDTI in the second network realm.

* * * * *